(12) United States Patent
Meisen

(10) Patent No.: US 6,849,196 B2
(45) Date of Patent: Feb. 1, 2005

(54) PROCESS FOR THE PREPARATION OF MAGNETITE PARTICLES AND THEIR USE

(75) Inventor: Ulrich Meisen, Kall (DE)

(73) Assignee: Bayer Aktiengesellschaft, Leverkusen (DE)

( * ) Notice: Subject to any disclaimer, the term of this patent is extended or adjusted under 35 U.S.C. 154(b) by 11 days.

(21) Appl. No.: 10/374,149

(22) Filed: Feb. 25, 2003

(65) Prior Publication Data

US 2003/0164468 A1 Sep. 4, 2003

(30) Foreign Application Priority Data

Mar. 1, 2002 (DE) .......................................... 102 09 150

(51) Int. Cl.⁷ .............................................. C01G 49/08
(52) U.S. Cl. ..................... 252/62.56; 106/456; 423/632
(58) Field of Search ....................... 252/62.56; 106/456; 423/632

(56) References Cited

U.S. PATENT DOCUMENTS

| 802,926 A | 10/1905 | Fireman | |
| 3,970,738 A | 7/1976 | Matsui et al. | ............... 423/140 |
| 4,382,882 A | 5/1983 | Vogel et al. | ................ 252/503 |
| 4,753,680 A | 6/1988 | Burow et al. | ............... 106/304 |
| 4,975,214 A | 12/1990 | Sakashita et al. | ........ 252/62.59 |
| 4,992,191 A | 2/1991 | Mori et al. | .............. 252/62.56 |
| 5,202,043 A | 4/1993 | Wiese et al. | ............. 252/62.56 |
| 6,562,533 B2 * | 5/2003 | Meisen | .................... 430/106.2 |
| 2002/0130296 A1 * | 9/2002 | Meisen | .................... 252/62.56 |

FOREIGN PATENT DOCUMENTS

| DE | 32 09 469 | 9/1982 |
| DE | 216 040 | 11/1984 |
| DE | 284 478 | 11/1990 |
| DE | 197 02 431 | 1/2000 |
| EP | 0279626 | 8/1988 |
| EP | 0422755 | 4/1991 |
| GB | 1 535 889 | 12/1978 |
| JP | 51-44298 | 4/1976 |
| JP | 61-34070 | 2/1986 |

* cited by examiner

Primary Examiner—C. Melissa Koslow
(74) Attorney, Agent, or Firm—Godfried R. Akorli; Diderico van Eyl

(57) ABSTRACT

The invention relates to a process for the preparation of magnetite particles and to their use.

6 Claims, No Drawings

PROCESS FOR THE PREPARATION OF MAGNETITE PARTICLES AND THEIR USE

BACKGROUND OF THE INVENTION

1. Field of the Invention

The invention relates to a process for the preparation of magnetite particles and to their use.

2. Brief Description of the Prior Art

Particulate magnetites which are prepared from aqueous solutions by a precipitation process have long been known. U.S. Pat. No. 802 928 describes the preparation of magnetite by precipitation of iron(II) sulphate using an alkaline component and subsequent oxidation with air. In numerous further, subsequent publications, the preparation of magnetites by the precipitation process is likewise described. The preparation of magnetites by the precipitation process with addition of silicon is described in JP-A 51 044 298. Pure precipitated magnetites without addition of foreign elements can be prepared batchwise according to DE-A 3 209 469 or continuously according to DE-A 2 618 058. Usually, $FeSO_4$ is used as the iron(II) salt. However, it is also possible to use any soluble iron(II) salt for the preparation of a magnetite by the precipitation process. The use of $FeCl_2$, as described in DE-A 3 004 718, is particularly suitable here. The use of $FeSO_4$ or $FeCl_2$ has the advantage that both substances &an be obtained in large amounts very economically as waste substances from the iron-processing industry. A suitable precipitating agent in addition to the most frequently used sodium hydroxide is also CaO or $CaCO_3$ (DE-A 3 004 718), ammonia (DE-A 2 460 493) or $Na_2CO_3$, $MgCO_3$ or MgO (EP-A 0 187 331). As a rule, air is used as an oxidizing agent. However, processes for oxidation with nitrates (DD-A 216 040 and DD-A 284 478) are also described.

The magnetites were initially used for the preparation of paints of all types. The particular advantage of magnetites over organic dyes and carbon black lies in their very much better weather resistance, so that paints containing magnetite can also be used outdoors.

Furthermore, precipitated magnetites are popularly used for colouring shaped concrete articles, such as, for example, concrete slab stones or concrete roof tiles.

Magnetites have for some time also been used for the preparation of toners in electrophotography. Magnetites which were prepared by the precipitation process are preferably used for the preparation of toners for copiers using one-component toners. The magnetic toners used for this purpose must have various properties. With progressive development and improvement of the copiers and printers, the requirements which the magnetic toners and consequently the magnetite used for this purpose have to meet have become increasingly high. The latest printer generation achieves a resolution of more than 400 dpi (dots per inch), for which the development of finely divided toners having a very narrow particle size distribution was required. As a result of this, the magnetites used for this purpose likewise have to have a very narrow particle size distribution. Furthermore, a specific particle size is required so that homogeneous distribution of the magnetite particles in the prepared toner is ensured. The magnetites themselves. Must have sufficiently high electrical resistance to stabilize the latent image during the electrostatic transfer. Furthermore, coercive force, saturation magnetization and especially the remanent magnetization must be in the correct ratio to the field strengths prevailing in the machine.

For use in magnetic toners, Si-containing magnetites are particularly frequently employed. These have a charge behaviour differing from that of pure magnetites and, with the same particle size, have higher thermal stability. A process for the preparation of such particles is described in JP-A 61 034 070. Here, the Si-component is added to the iron(II) sulphate, which however leads to precipitates of silica and hence to a non uniform distribution of the silicon in the magnetite lattice. U.S. Pat. No. 4,992,191 describes a magnetite containing 0.1 to 5.0 atom % of Si, based on Fe, which is said to be particularly suitable for the preparation of toners.

In the process described there, a silicate component is added to an alkaline component in the form of an aqueous solution, and then an iron(II) component in the form of an aqueous solution is added in an amount such that a molar ratio of Fe(II) component to alkaline component of about $$0.53\left[\frac{1.5}{2.85}\right]$$

is present, the temperature being kept at 90° C. The suspension thus obtained is then treated with air as an oxidizing agent in order to obtain spheroidal, silicon-containing magnetite having a particle size in the range of 0.1 to 1.0 μm. The particles obtained are filtered, washed and milled.

DE-A 19 702 431 describes a further process for the preparation of particularly round Si-containing magnetites. There, the preparation of Si-free round magnetites is also described for the first time in detail in a comparative example. However, the thermal stability of these magnetites is described as being insufficient for the preparation of magnetic toners.

It was the object of the present invention to develop a process for the preparation of round low-Si magnetites (Si content less than 0.025% by weight), which are particularly suitable for newly developed copiers and laser printers. In the current generation of copiers and laser printers, magnetites having relatively high coercive forces (3 979 to 7 162 kA/=40 to 90 Oe) are increasingly required. By using low-Si magnetites, the charge behaviour can be adjusted using charge additives independently of the magnetite. The flow properties of the toner prepared using such magnetites can likewise be adjusted using flow improvers (typically finely divided silica), independently of the inherent flow behaviour of the magnetite.

It was surprisingly found that the magnetites described in DE-A 19 702 431 as being insufficiently thermally stable can be very readily used in toners. Moreover, the preparation process is more economical owing to the omission of the component introducing the Si, with the result that a process step is also dispensed with.

This object could be achieved by the magnetites according to the process according to the invention. These magnetites can not only be used in magnetic toners but also for colouring paper, plastic, finishes, fibres and concrete and in paints.

SUMMARY OF THE INVENTION

Magnetites having a particle size, as determined from electron micrographs, of 0.1 to 0.5 μm, a BET surface area of 3 to 13 m²/g, a DIN pH (measured on the suspended powder) of 4 to 9 and coercive force of 3 979 to 7 162 kA/m (50 to 90 Oe), which can be used according to the invention are obtainable by:

a) initially introducing an alkaline component in the form of an aqueous solution under an inert gas,
b) heating the alkaline component to a temperature of 30 to 90° C., preferably to 60 to 90° C., c) adding an iron component in the form of an aqueous solution in an amount such that a molar ratio of Fe component to one equivalent of alkaline component of from 0.48 to 0.6 is present, the temperature being kept at 30 to 90° C., preferably 60 to 90° C., and the Fe(III) content of the Fe component being 0.2 to 1.5 mol % of Fe(III), optionally heating the suspension obtained under c) to a temperature of 60 to 100° C., preferably 70 to 90° C., it being necessary for this temperature to be higher then the temperature mentioned under c), e) treating the suspension obtained under c) with an oxidizing agent until an Fe(III) content of more than 65 mol % is present in the iron compound, f) after the oxidation under e), optionally once again under inert gas, adding an alkaline component in the form of an aqueous solution to the suspension obtained in e), in an amount such that a molar ratio of Fe used under c) to one equivalent of total alkaline component used of 0.42 to 0.47, preferably 0.44 to 0.46 is obtained, g) heating the suspension obtained after f) to 50 to 100° C., preferably 60 to 90° C.

h) adding an Fe component in the form of an aqueous solution in an amount such that a pH, measured in the suspension, of 6 to 8 is established, i) effecting oxidation with an oxidizing agent to a Fe(III) content of more than 65 mol %, based on iron content, in the iron compound, and then j) effecting filtration and washing, drying and milling of the residue.

The particle size and particle shape of the magnetites can be controlled by the pH during precipitation. If the magnetites are precipitated in the Fe(II)/NaOH ratio range of more than 0.48, round particles which are distinguished by low remanence and coercive force are increasingly obtained. Furthermore, these particles are generally relatively finely divided in comparison with the magnetites prepared at other pHs. By reducing the precipitation temperature, i.e. the temperature at which the iron component and the alkaline component (also referred to as precipitating agent) are mixed, particularly fine particles can be prepared. Furthermore, it is possible to control the finely divided character by controlled addition of Fe(III) to the Fe(II) component. U.S. Pat. No. 4,975,214 discloses the preparation of finely divided Si-containing magnetites (0.5 to 20 m²/g BET surface area) by adjusting the Fe(III) content to 1.666 to 2.5 mol %. The adjustment of the particle size of precipitated magnetites by means of the Fe(III) content is generally known from DE-A 3 500 471. The exact range which is required for the preparation of the particles according to the invention, namely 0.2 to 1.5 mol % of Fe(III), can no longer be derived from the above-mentioned documents.

By addition of sodium hydroxide solution after the end of the first oxidation, further addition of iron in the form of a water-soluble iron(II) salt and further oxidation, it is possible to make these finely divided magnetites coarser if required. This improves thermal stability. A further improvement in the thermal stability can be achieved by aftertreatment with organic or inorganic substances. Inorganic Al, Si, Ti, Mg, Ce, La or Zr compounds which form dense hydroxide or oxyhydroxide layers on precipitation are preferably used here. However, the addition of organic aftertreatment agents, such as polysiloxanes or Ti esters, is particularly preferred.

DETAILED DESCRIPTION OF THE INVENTION

An alkali metal hydroxide, an alkaline earth metal hydroxide, an alkaline earth metal oxide; an alkali metal carbonate, $MgCO_3$ or ammonia may preferably be used as the alkaline component. Preferably a water-soluble Fe(II) salt, particularly preferably iron sulphate or iron dichloride is used as the iron(II) component. However, it is also possible to use other water-soluble Fe(II) compounds, particularly if they are available at comparable prices. Atmospheric oxygen, pure oxygen, $H_2O_2$, chlorine, alkali metal chlorates (e.g. $NaOCl$, $NaClO_3$, $NaClO_4$) or nitrates may be used as oxidizing agents. Atmospheric oxygen, pure oxygen, $H_2O_2$ or sodium nitrate is particularly preferably used.

A particularly preferred embodiment of the process according to the invention is to be described in more detail below to further illustrate the invention:

Sodium hydroxide solution containing 300 g of NaOH per liter of water is initially introduced into a batchwise stirred vessel while stirring and passing through inert gas.

Heating is then effected to a temperature of from 30 to 100° C., preferably from 60 to 90° C. Once this temperature has been reached, the metering of the Fe(II) component is begun. The Fe(III) content of the Fe(II) component is 0.2 to 1.5 mol % of Fe(III). The calculation for the Fe(II) component is effected by means of the desired NaOH/Fe(II) ratio. If, for example, an NaOH/Fe(II) ratio of 0.55 is desired and 100 mol of NaOH are initially introduced, 100×0.55=55 mol of Fe(II) component must be added. The calculation of the alkali metal hydroxide/Fe(II) ratio is based on the equation

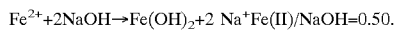
$$Fe^{2+}+2NaOH \rightarrow Fe(OH)_2+2\ Na^+ Fe(II)/NaOH=0.50.$$

If an alkaline component which reacts with the Fe(II) compound in a different stoichiometric ratio to give $Fe(OH)_2$ or $FeCO_3$ is used, the ratio should be changed accordingly. This case occurs, for example, with the use of carbonates or alkaline earth metal hydroxides or oxides, so that in these cases the following equation results:

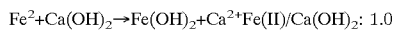
$$Fe^{2+}+Ca(OH)_2 \rightarrow Fe(OH)_2+Ca^{2+} Fe(II)/Ca(OH)_2: 1.0$$

or

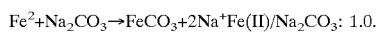
$$Fe^{2+}+Na_2CO_3 \rightarrow FeCO_3+2Na^+ Fe(II)/Na_2CO_3: 1.0.$$

After the addition of the calculated amount of the Fe(II) component is complete, heating is optionally once again effected to 60 to 100° C. In many cases, the temperature under b) and the temperature under c) are identical, so that a further heating step is not required in c). Once the temperature has been reached, the gassing with inert gas is terminated and the addition of the oxidizing agent is begun. In the case of gassing with air, air is introduced via a gassing apparatus below the stirrer. Other technical embodiments for gassing with air, such as, for example, binary nozzles, injectors, ejectors or introduction in pipelines with static mixers, are also possible. The amount of air fed in per hour is from 0.5 to 15 l/h per mole of Fe(II).

The calculation for the other oxidizing agents is carried out according to the redox equivalents of the respective oxidizing agents. It should be noted that not more than 66.6% of the Fe(II) must be oxidized for the preparation of magnetite.

The oxidation is preferably terminated when an Fe(III) content of more than 65 mol % has been reached. This can be determined by redox titration.

After the first oxidation (steps a) to e)), these steps can be carried out again. An alkaline component is added to the suspension from e) while stirring and passing through inert gas. The required amount of alkaline component is calculated as stated above from the Fe(II)/NaOH ratio required here. The Fe(II) component is then added until a pH of from 6 to 8 is established in the suspension. After addition of this amount of Fe(II) component, the passage of inert gas is stopped and the oxidation is begun again.

After the end of the second oxidation, the product is filtered, washed and dried. Before the drying, the product can be aftertreated for improving the thermal stability and the dispersibility. Polysiloxane or organic Ti ester is preferably used for this purpose.

The magnetites prepared by the process according to the invention or the magnetites according to the invention can be particularly advantageously used for the preparation of toners, of printing inks and of print pastes for inkjet printers.

The measurement of the properties of the magnetites is carried out by the following methods:
1. The magnetic values (coercive force, specific saturation magnetization, specific remanent magnetization) are measured using a magnetometer from Bayer (at 5 000 Oe field strength (corresponding to 397.9 A·m$^{-1}$)).
2. The BET surface area is measured according to DIN 66 131:
   Gas mixture: 90% He, 10% N$_2$; measurement temperature: 77.4 K; heating at 140° C., 60 minutes.
3. Elemental analysis for Si and Mn:
   Si is determined by ICP-OES spectral analysis. Mn is determined by atomic absorption spectroscopy.
4. Elemental analysis for Fe (total), Fe(II) and Fe(III):
   Determinations according to DIN 55 913: the Fe(II) content is determined by titration with KMnO$_4$ by means of a Memotitrator (Mettler DL-70). Fe(III) is determined analogously with TiCl$_3$. The total iron content is calculated from the two individual values and the sample weight. The contents of the two standard solutions are determined daily.
5. Particle shape and particle size:
   Estimation of the particle size and particle shape from a transmission electron micrograph (TEM) at 30 000 times magnification.
6. The sphericity is determined by means of image analysis on the basis of a TEM at 30 000 times magnification. The evaluation is carried out by the form factor method by means of an automatic image analysis system (IBAS, from Zeiss). Here, the ratio of minimum diameter to maximum diameter of a particle gives the form factor. The closer this value is to 1.0, the rounder is a particle.
7. The pH of the magnetite powder is determined according to ISO-EN 787 Part 9.

The invention is to be explained in more detail with reference to the following non-limiting examples.

EXAMPLES

Example 1

6423 g of sodium hydroxide solution having a content of 316.2 g/l, which corresponds to 40 mol of NaOH, were introduced into a stirred vessel having an effective volume of 30 liters. After the nitrogen gassing means and the stirrer had been switched on, the sodium hydroxide solution was heated to 30° C. 14.736 liters of iron(II) sulphate solution containing 216.48 g/l of Fe as FeSO$_4$ (calculated, 21 mol of Fe) and containing 0.25 mol % of Fe(III) were then pumped in, in 66 minutes. The FeSO$_4$/NaOH ratio was 0.525. Thereafter, the nitrogen gassing means was switched off and gassing was effected with 25 l/h of air via a gassing ring mounted below the stirrer. The gassing was terminated after an Fe(III) content of 66 mol % had been reached.

After the end of the oxidation, the suspension was filtered, thoroughly washed with demineralized water and dried at 40° C. under air. The powder obtained was milled in an impact mill.

The magnetite obtained had the following properties:

| | |
|---|---|
| Si content | 0.017% by weight |
| Coercive force | 6134 kA/m = 77 Oe |
| Saturation magnetization | 1142 Gcm$^3$/g = 114.2 nTcm$^3$/g |
| Remanence | 160 Gcm$^3$/g = 16 nTcm$^3$/g |
| Particle size | 0.2 μm |
| DIN pH | 8.4 |
| BET surface area | 9.8 m$^2$/g |

Example 2

6400 kg of NaOH as a solution having a content of 300 g/l, which corresponds to 160 kmol of NaOH, were introduced into a stirred vessel having an effective volume of 100 m$^3$. After the nitrogen gassing means and the stirrer had been switched on, the sodium hydroxide solution was heated to 90° C. 50.2 m$^3$ of iron(II) sulphate solution having a content of 254.4 g/l, which corresponded to 84.05 kmol of Fe(II), were pumped in in 64 minutes. The Fe(II) sulphate solution had an Fe(III) content of 1.24 mol %. The FeSO$_4$/NaOH ratio was 0.525. The nitrogen gassing means was then switched off and gassing was effected at 200 m$^3$/h of air via a gassing ring mounted below the stirrer. The gassing was terminated after an Fe(III) content of 67 mol % had been reached.

After the end of this reaction, the suspension was filtered, thoroughly washed with demineralized water and spray dried at an exit gas temperature of 110° C. The powder obtained was milled in an impact mill. The product obtained had the following properties:

| | |
|---|---|
| Si content | 0.02% by weight |
| Coercive force | 61 Oe = 4860 kA/m |
| Saturation magnetization | 1108 Gcm$^3$/g = 110.8 nTcm$^3$/g |
| Remanence | 129 Gcm$^3$/g = 13 nTcm$^3$/g |
| Particle size | 0.2 μm |
| BET surface area | 8.6 m$^2$/g |
| DIN pH | 7.4 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. Process for the preparation of a low-Si magnetite having a silicon content of less than 0.025% by weight, a particle size, as determined from electron micrographs, of 0.1 to 0.5 μm, a BET surface area of 3 to 13 m$^2$/g, a DIN pH (measured on the suspended powder) of 4 to 9 and a coercive force of 3 979 to 7 162 kA/m (50 to 90 Oe), comprising:
   a) introducing an alkaline component in the form of an aqueous solution under an inert gas,
   b) heating the alkaline component to a temperature of 30 to 90° C.,
   c) adding an iron component in the form of an aqueous solution in an amount sufficient to present a molar ratio of Fe component to one equivalent of alkaline component of 0.48 to 0.6, the temperature being kept at 30 to 90° C., and the Fe(III) content of the Fe component being 0.2 to 1.5 mol % of Fe(III), d) optionally heating the suspension obtained under c) to a temperature of 60 to 100° C., it being necessary for this temperature to be higher than the temperature mentioned under c), e) treating the suspension obtained under c) with an oxidizing agent until an Fe(III) content of more than 65 mol % is present in the iron compound, f) adding, after the oxidation under e), an alkaline component in the form of an aqueous solution, optionally under inert gas, to the suspension obtained in e), in an amount sufficient to present a molar ratio of Fe used under c) to one equivalent of total alkaline component used of 0.42 to 0.47, g) heating the suspension obtained after f) to 50 to 100° C., h) adding an Fe component in the form of an aqueous solution in an amount sufficient to establish a pH, measured in the suspension, of 6 to 8, i) oxidizing the resulting suspension of h) with an oxidizing agent to an Fe(III) content in the iron compound of more than 65 mol %, based on iron content, and then j) filtering the reaction product of I) and washing, drying and milling the residue.

2. Process according to claim 1, wherein ammonia, alkali metal hydroxides, alkaline earth metal hydroxides, alkaline earth metal oxides or alkaline earth metal carbonates are used as the alkaline component.

3. Process according to claim 1, wherein iron sulphate or iron dichloride is used as the iron(II) component.

4. Process according to claim 1, wherein atmospheric oxygen, $H_2O_2$, chlorine, alkali metal chlorates or a nitrate is used as the oxidizing agent.

5. A process for preparing toners or printing inks comprising incorporating the magnetites prepared according to claim 1.

6. A process for preparing colouring concrete, finishes, plastics, paper and emulsion paints comprising incorporating the magnetites prepared according to claim 1.

* * * * *